United States Patent Office 3,092,663
Patented June 4, 1963

3,092,663
2-HYDROXY-2',4,5-TRIMETHYLBENZOPHENONE
Lester N. Stanley, Delmar, N.Y., assignor to General Aniline & Film Corporation, New York, N.Y., a corporation of Delaware
No Drawing. Filed Aug. 24, 1961, Ser. No. 133,563
1 Claim. (Cl. 260—591)

This invention relates to 2-hydroxy-2',4,5-trimethylbenzophenone having new and novel uses as a stabilizer against ultraviolet degradation and to polyalkylene plastic compositions containing the same.

It is known that various mono-, di-, tri- and tetra-hydroxybenzophenones have been utilized as ultraviolet light absorbing compounds and applied to various organic substances which tend to deteriorate by the absorption of ultraviolet light. It is also known that many of such benzophenone compounds have poor solubilities in drying oils, aliphatic hydrocarbon media and resin systems containing the same. Even though solubility is initially satisfactory, they may crystallize or bloom out of the media within short periods of time.

Mineral spirits, i.e. straight petroleum aliphatic solvents used as paint and varnish thinner, of which "Varsol No. 1" is a commercially available example, is typical of a solvent media in which many of the foregoing benzophenones are insoluble. Yet in many instances, it is desirable to include ultraviolet absorbing agents in paint and varnish formulations in order to protect the paint and varnish itself from deterioration (such as discoloration and oxidation), to protect the pigmentation incorporated therein and in some cases the object painted. Other mediums in which considerable difficulty has been encountered in the use of o-hydroxybenzophenone compounds as stabilizers are the polyalkylene plastics, such as polyethylene, polypropylene, polybutene-1 and polystyrene.

Still other types of formulations which require protection against irradiation by ultraviolet light and in which the foregoing benzophenones are frequently difficulty soluble are polyester dopes employed in the production of polyester resin coatings, films, etc. This is a serious disadvantage because of the high viscosity and thick sirupy nature of the polyester dopes. For example, 2,4-dihydroxybenzophenone has some solubility, but is difficult to use because of the very prolonged stirring required to dissolve it completely.

I have now found that 2-hydroxy-2',4,5-trimethylbenzophenone of the formula:

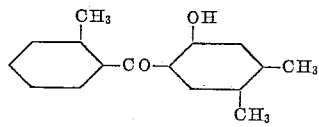

has many favorable properties which renders it particularly useful for incorporation into many systems, in particular paints, varnishes, hydrocarbon oils, polyalkylene plastics such as polyethylene, polypropylene, polybutene-1 and polystyrene, polyester dope, various aliphatic hydrocarbon solvent systems, etc. Whereas the majority of o-hydroxybenzophenone compounds have low solubilities in mineral oil, the homologous 2-hydroxy-4,5-dimethyl benzophenone has only 2.1% solubility in Varsol No. 1, and the isomeric 2-hydroxy-4,4',5-trimethylbenzophenone has only 3% solubility in Varsol No. 1, whereas the greater majority of commercially available o-hydroxybenzophenone compounds have less than 1% solubility in mineral oil. Surprisingly and unexpectedly, the solubility of 2-hydroxy-2',4,5-trimethylbenzophenone in mineral oil (Varsol No. 1) is 24.6% by weight.

Due to this unexpected mineral oil solubility, 2-hydroxy-2',4,5-trimethylbenzophenone is exceptionally excellent for use in oil-containing media such as paints, varnishes and various drying oil compositions. It is particularly useful in defluorescent oils such as are used in oil drilling operations. It prevents the oil used in the drill bit from fluorescing under the ultraviolet lamp on exploratory tests.

I have also found that 2-hydroxy-2',4,5-trimethylbenzophenone has outstanding solubility and non-bloom properties when employed as an ultraviolet absorber in polyalkylene plastic systems, such as polyethylene, polypropylene, polybutene-1 and polystyrene. For example, the homologous 2-hydroxy-4,5-dimethylbenzophenone blooms out of DYNH (Union Carbide's low density polyethylene; $d=0.92$) polyethylene at 0.4% concentration after 2 days. The isomeric 2-hydroxy-4,4',5-trimethylbenzophenone blooms out of DYNH polyethylene in 2 days at 0.7% concentration. The compatibility of most other commercially available o-hydroxybenzophenones in DYNH polyethylene is less than 0.25%. In contrast, 2-hydroxy-2',4,5-trimethylbenzophenone is compatible with the polyalkylene plastics in a concentration ranging from 0.01 to 10% and does not bloom out in periods up to 200 days. For practical purposes, the preferred stabilizing range is from 0.1 to 5% by weight of the polyalkylene plastic resin.

The 2-hydroxy-2',4,5-trimethylbenzophenone has an unexpected and excellent degree of solubility in polyester dope and does not bloom out of the final resin. In a standard solution test [1 gram in 200 grams of Polylite 8000 (Reichold Chemical's alkyd resin in styrene monomer)] 2-hydroxy-2,4,5-trimethylbenzophenone goes completely into solution in 1 minute whereas other commercial benzophenones do not show this ease of solution. For example, 2,2'-dihydroxy-4-methoxybenzophenone and 2-hydroxy-4-methoxybenzophenone, both commercially available and frequently used for this purpose, require more than 5 minutes for solution in this standard test. In addition, the 2-hydroxy-2',4,5-trimethylbenzophenone shows excellent solubility in such solvents and plasticizers as dibutyl and dioctyl phthalates, tricresyl phosphate, ethylene dichloride, methanol, ethanol, ethyl acetate, methyl ethyl ketone, toluene and linseed oil.

Furthermore, I have found that the presence of the 4,5-dimethyl configuration causes a shift in the K maximum to about 346–347 m$\mu$; thus this favorable shift of the K maximum, especially in addition to its excellent solubility feature, renders 2-hydroxy-2',4,5-trimethylbenzophenone particularly valuable as an ultraviolet absorber.

The following example will show the preparation of the 2-hydroxy-2',4,5-trimethylbenzophenone:

*Example 1*

492 grams of phosphoric acid (103% $H_3PO_4$), 46 grams of o-toluic acid, 41 grams of 3,4-xylenol and 104 grams of anhydrous zinc chloride are heated with stirring to 40° C. 59 grams of phosphorus trichloride are added at 40–45° C. over a period of 1½–2 hours. It is heated to 60° C. and held for 23 hours, then drowned in 2500 cc. of water. The tacky reaction product is washed several times with warm water (about 60° C.) which melts it to an oil, the wash water layer being drawn off by suction or decantation. When the product crystallizes it is filtered and dried in a 40° C. vacuum oven. 70 grams of crude product is obtained (87% of theoretical yield). It is purified by dissolving in a boiling 30° aqueous isopropanol solution, clarified by treatment with Nuchar, cooled to about 5° C., filtered and dried. The product has a M.P. of 58.2–59.4° C.

The following examples will show the utilization of the 2-hydroxy-2',4,5-trimethylbenzophenone as a stabilizer against ultraviolet degradation in various compositions:

*Example 2*

A good spar varnish consists primarily of a combination of non-volatile ingredients which include resinous materials and oils of the drying type and volatile ingredients which include alcohols, turpentine and hydrocarbon solvents. The addition of 0.01-5% of ultraviolet agents increases the stability of the varnish through protection from deterioration of the varnish per se from ultraviolet light and also gives added protection to the object coated. The problem in the past has been to find satisfactory ultraviolet agents which are sufficiently soluble in varnish formulations, especially those of the type which include mineral spirits such as Varsol No. 1. I have found that 2-hydroxy-2',4,5-trimethylbenzophenone is particularly adaptable for such use. It has the advantage in that it is sufficiently soluble in Varsol so that it can be added (already dissolved as a concentrated solution) to any paint or varnish in the form of the thinner at any point or just before use. The following exemplifies such a formulation:

A spar varnish formulation is made up which comprises

| | Parts by weight |
|---|---|
| Phenol-formaldehyde resin | 2.8 |
| Tung oil | 6.0 |
| Castor oil | 1.0 |
| Linseed oil | 0.2 |
| n-Butanol | 0.5 |
| Turpentine | 1.0 |
| Varsol No. 1 | 7.5 |
| Petroleum naphtha | 1.0 |
| 2-hydroxy-2',4,5-trimethylbenzophenone | 0.3 |

After varnishing and exposing test strips of wood to sunlight for 50 weeks, a strip which contains the ultraviolet absorbing agent shows less discoloration and greater gloss than a strip treated with a similar formulation but without the ultraviolet absorbing agent.

Example 3

Wall paints primarily comprise pigmentation and binder, but the particular properties of each paint are affected by the proper selection of oils and varnishes, acidity, proper selection of extenders, evaporation rate of the thinners, viscosity of the oils or varnishes used and the like.

A gloss wall paint is made up as follows:

| | Parts by weight |
|---|---|
| Lithopone | 3.44 |
| Rutile titanium calcium pigment | 2.43 |
| Kettle bodied linseed oil (Body X—Y) | 1.22 |
| Ester gum solution 65% solids | 0.42 |
| 25 gal. wood oil varnish (43% solids) | 3.69 |
| Varsol No. 1 | 0.66 |
| 24% lead naphthenate | 0.02 |
| 6% cobalt naphthenate | 0.008 |
| 2-hydroxy-2',4,5-trimethylbenzophenone | .04 |

After painting test strips and exposing to sunlight for 50 weeks, a strip painted with a paint comprising the ultraviolet agent shows less yellowing and greater gloss than a strip painted with the same paint minus the ultraviolet agent.

Example 4

A polyester resin is prepared by coreacting 3 mols of phthalic anhydride, 3 mols of fumaric acid and 6.6 mols of propylene glycol. When esterification is substantially complete, as indicated by an acid number of about 30-40, styrene is added in a sufficient amount to equal ½ of the polyester resin present. 0.02%, based on the total weight, of di-tert. butylhydroquinone is added.

To 200 parts of this resin mixture is added 2 parts of lauryl mercaptan as a 10% solution in styrene, 2 parts of methyl ethyl ketone peroxide and 1 part by weight of 2-hydroxy-2',4,5-trimethylbenzophenone. This is poured into a suitable mold and cured in an oven by gradually heating to 250° F. and holding for 3 hours.

On exposure to light in a fadeometer for 300 hours, this sample showed less deterioration and discoloration than a similar sample made excluding the ultraviolet absorber.

Example 5

0.5 part by weight of 2-hydroxy-2',4,5-trimethylbenzophenone is milled with 100 parts by weight of a high density polyethylene resin commercially available under the brand name of Fortiflex A-70 (density 0.96) on a two roll mill at 120° C. until uniform. While still hot, the batch is passed through a two roll cold mill to obtain a rough sheet of polyethylene. A small piece is cut and pressed out between two thin aluminum sheets on a Carver press at approximately 110° C. to a film having an approximate thickness of six mils. After six months' storage, the film shows no signs of blooming and is as transparent as a similar film made without the ultraviolet absorber. In addition, spectro curves of the film before and after 110 hours exposure in a fadeometer show relatively little change in absorptive power. There is no brittleness or loss of flexibility in the film which occurs when no UVL absorber is used as a control.

Example 6

1.0 part by weight of 2-hydroxy-2',4,5-trimethylbenzophenone is milled with 100 parts by weight of a low density (d=0.92) polyethylene resin commercially available under the brand name of DYNH on a two roll mill at 120° C. until uniform. While still hot, the batch is passed through a two roll cold mill to obtain a rough sheet of polyethylene. A small piece is cut and pressed out between two thin aluminum sheets on a Carver press at approximately 110° C. to a film having an approximate thickness of six mils. After six months' storage, the film shows no signs of blooming and is as transparent as a similar film made without the ultraviolet absorber. In addition, spectro curves of the film before and after 110 hours exposure in a fadeometer show relatively little change in absorptive power. There is no brittleness or loss of flexibility in the film which occurs when no UVL absorber is used as a control.

Example 7

0.25% by weight of 2-hydroxy-2',4,5-trimethylbenzophenone is milled into polypropylene of a melt index of 0.08 on a two roll mill at 150-160° C. until the batch is uniform. While still hot, the batch is then pressed through a two roll cold mill to obtain a rough sheet of polypropylene. A small piece is cut and pressed out between two thin aluminum sheets on a Carver press at approximately 150° C. to a film having an approximate thickness of 6 mils. After two months storage, the film does not show any sign of blooming nor can the ultraviolet absorber be rubbed off or washed out with alcohol. The film is as transparent as one which is made in the same way without the ultraviolet absorber.

I claim:

A composition of matter having the following formula:

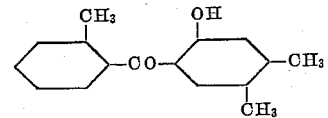

References Cited in the file of this patent

UNITED STATES PATENTS

| 2,659,709 | Daglish et al. | Nov. 17, 1953 |
| 2,887,466 | Lappin et al. | May 19, 1959 |
| 3,006,887 | Schoepfle et al. | Oct. 31, 1961 |

OTHER REFERENCES

Chemical Abstracts, 48, 7572e (1954).
Chemical Abstracts, 50, 7780e (1956).